United States Patent [19]

Powell

[11] Patent Number: 4,506,147
[45] Date of Patent: Mar. 19, 1985

[54] HUBODOMETER ADAPTED FOR SELECTABLE GEAR RATIOS

[75] Inventor: Patrick L. Powell, Franklin Park, Ill.

[73] Assignee: Standard Car Truck Company, Park Ridge, Ill.

[21] Appl. No.: 589,236

[22] Filed: Mar. 14, 1984

[51] Int. Cl.³ ............................................. G01C 22/00
[52] U.S. Cl. ................................... 235/95 B; 235/96; 235/131 JA; 235/133 R
[58] Field of Search ............... 235/95 B, 96, 142, 143, 235/135, 131 R, 131 JA, 133 R; 74/DIG. 10

[56] References Cited

U.S. PATENT DOCUMENTS

| | | | |
|---|---|---|---|
| 2,977,811 | 4/1961 | Roberts | 235/131 R X |
| 3,184,982 | 5/1965 | Auer | 235/131 R X |
| 3,598,309 | 8/1971 | Engler et al. | 235/96 X |
| 4,101,762 | 7/1978 | Borgstrom | 235/95 B X |
| 4,430,561 | 2/1984 | Powell | 235/95 B |

*Primary Examiner*—Benjamin R. Fuller
*Attorney, Agent, or Firm*—Augustus G. Douvas

[57] ABSTRACT

A hubodometer having a wide range of selectable gear ratios so that the same basic structure can be used to indicate distance traveled by wheels of greatly different wheel diameters in either miles or kilometers. The hubodometer has an elongated bore extending through a frame and centered on the axis of rotation of the hubodometer. An odometer helical drive gear and shaft is mounted on the frame transversely to the axis of rotation and removed from the bore in the frame. In assembly of the hubodometer, if a first gear ratio is desired, a support shaft carrying a gear is located within the bore and is fixed to rotate with the casing on its axis of rotation. This gear engages the odometer helical drive gear at a first locus so that the odometer reading is responsive to the rotation of the casing with a first gear ratio. If a second gear ratio is desired, a support shaft having no gear is located within the bore and is fixed to rotate with the hubodometer casing. The odometer helical drive gear is driven at a second locus, however, by a second gear train which includes a spur gear fixed to the hubodometer casing so as to rotate therewith. The range of gear ratios is further enhanced by a ratchet and pawl assembly which includes one compound ratchet wheel selected from a group of available compound ratchet wheels.

13 Claims, 15 Drawing Figures

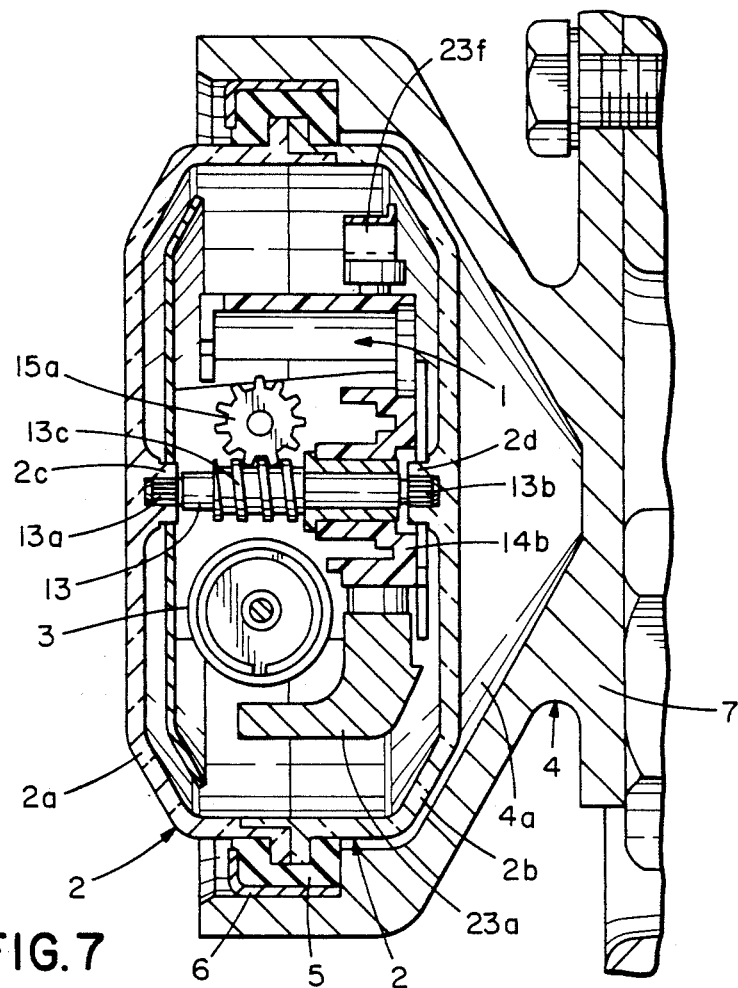
FIG.7
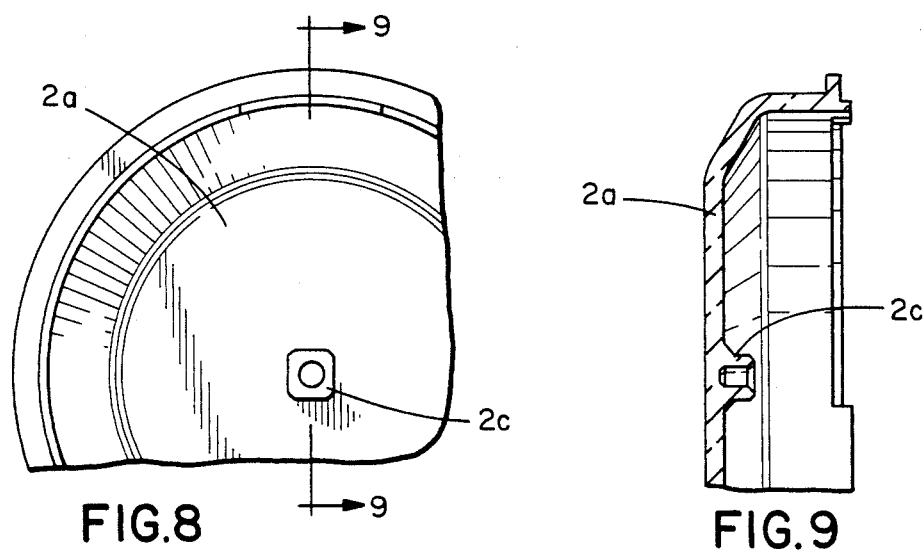
FIG.8
FIG.9

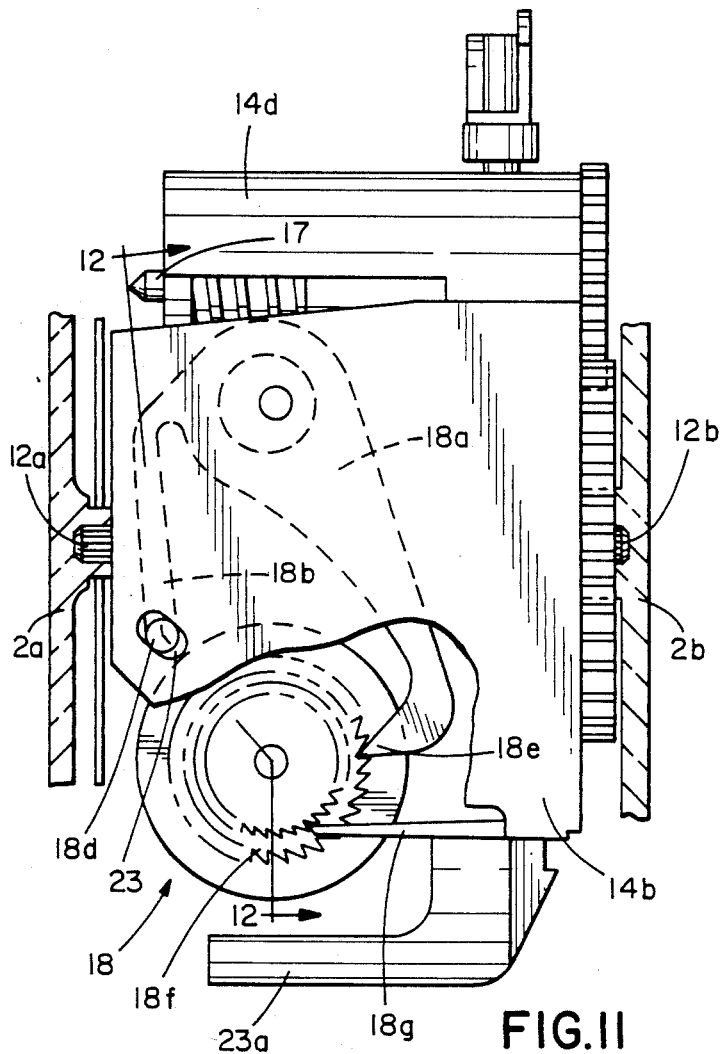
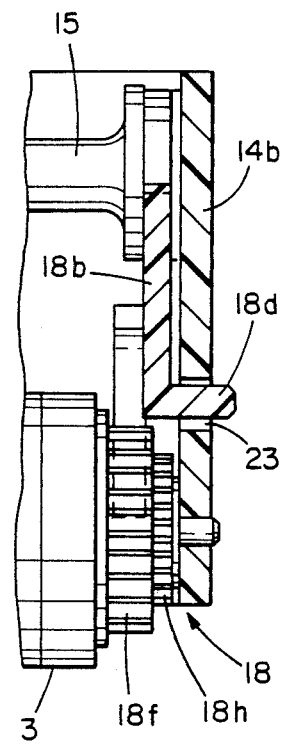
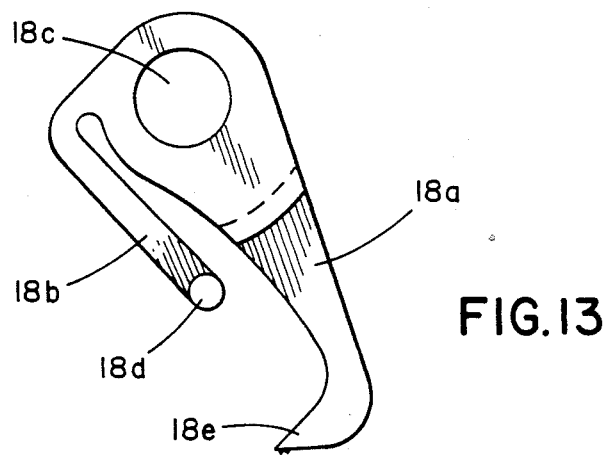
FIG.11
FIG.12
FIG.13

| TEETH 18f | "A" DIM. | "B" DIM. | "C" & "E" DIM. | "D" DIM. |
|---|---|---|---|---|
| 22 | .521/.519 | .441/.439 | 16°21'6" | 1°45' |
| 23 | .521/.519 | .441/.439 | 15°39'13" | 4°0' |
| 24 | .521/.519 | .441/.439 | 15° | 6°0' |
| 25 | .521/.519 | .441/.439 | 14°24' | 9°30' |
| 26 | .501/.499 | .421/.419 | 13°50'45" | 9°30' |
| 27 | .561/.559 | .451/.449 | 13°20' | 0°0' |
| 28 | .581/.579 | .481/.479 | 12°51'4 1/4" | 3°15' |
| 31 | .581/.579 | .497/.495 | 11°36'47 1/2" | 9°0' |
| 39 | .581/.579 | .461/.459 | 9°13'23" | 3°0' |

HUBODOMETER ADAPTED FOR SELECTABLE GEAR RATIOS

BACKGROUND OF THE INVENTION

The invention relates to improvements in the inventor's patented hubodometer disclosed in U.S. Pat. No. 4,430,561 issued Feb. 7, 1984. These improvements relate to a design for increasing the range of selectable gear ratios attainable from a single basic hubodometer frame and related components, which support a gear driven odometer and a counterweight common to most mechanical hubodometer designs.

Mechanical hubodometers employ an odometer which is calibrated to render a readout in any desired unit, such as miles, revolutions, yards, pieces and the like.

When used to measure distances, for example, the odometer must be actuated by a different gear ratio for each different wheel diameter. The gear ratio also changes depending upon whether distances are to be read in terms of English or metric units.

Prior art hubodometer designs do not have the capability to accept a wide range of gear ratios. Accordingly, in many instances a manufacturer cannot employ a single basic hubodometer frame and counterweight assembly for a broad range of gear ratios. Therefore, the manufacturer either had to fabricate and inventory several different frame and counterweight assemblies each having an ability to accept only a limited or restricted range of gear ratios, or the manufacturer did not attempt to supply the entire hubodometer market which is made up of applications in which hubodometers must render accurate measurements in either miles or kilometers, for example, with many different wheel sizes.

As a result, the economies which result from the manufacture, inventory and sale of a simple basic hubodometer frame and counterweight assembly for a wide range of gear ratios are difficult to obtain with prior art designs.

SUMMARY OF THE INVENTION

Accordingly, a principal object of this invention is to provide an improved mechanical hubodometer employing a single basic frame and counterweight assembly which will receive odometer drive gear structures having a wide range of gear ratios.

Another object of the invention is to further increase hubodometer gear ratios by improving the pawl and ratchet drive assemblies used to actuate a hubodometer so that the same basic drive and locking pawls can be used with a wide range of ratchet wheel diameters and tooth spacing. This broadens the number of hubodometer applications which may be served by identical and common hubodometer parts.

A further object of the invention is to reduce hubodometer manufacturing costs by using common components in hubodometers adapted to receive a wide range of gear ratios.

A principal structural feature for attaining the foregoing objects relates to an improved hubodometer frame for supporting and housing the gears which drive the odometer. The frame has an elongated bore centered on the axis of rotation of the hubodometer. An odometer helical drive gear and shaft are mounted on the frame transversely to the axis of rotation and removed from the bore in the frame. The helical drive gear is selectively engaged from either below or above depending upon the gear ratio desired.

In the assembly of the hubodometer, if a first gear ratio is desired, a support shaft having a gear located within the bore and fixed to rotate with the casing on its axis of rotation is used to engage the odometer helical drive gear from below. Alternatively, if a second gear ratio is desired, a support shaft having no gears is located within the bore and is fixed to rotate with the casing. A drive spur gear is mounted on the casing to rotate with the casing on its axis of rotation and a driven spur gear engages the drive spur gear. A driven gear shaft is rotatably supported on the frame on an axis removed from the bore but parallel to the axis of rotation of the hubodometer with the driven spur gear being fixed to one end of the driven gear shaft to rotate the shaft in response to rotation of the casing. A second driven or worm gear is fixed to the other end of the driven gear shaft to rotate with the driven gear shaft, and the second driven or worm gear engages the odometer helical drive gear from above so that the odometer reading is responsive to the rotation of the casing with a second gear ratio.

A second principal structural feature for attaining the above objects relates to a ratchet and pawl assembly having a compound ratchet wheel which includes a drive ratchet wheel integral with a locking ratchet wheel. The locking ratchet wheel has a fixed diameter and also a fixed number of equally spaced ratchet teeth; however, the drive ratchet wheel is fabricated in several different diameters and with several different numbers of equally spaced teeth.

By selecting from a group of compound ratchet wheels, the one which has a properly dimensioned drive ratchet wheel, the overall range of selectable drive gear ratios of a hubodometer is greatly expanded.

The drive ratchet wheel is driven by a pawl restrained by a resilient arm which forces the pawl into engagement with the drive ratchet wheel.

The locking ratchet wheel is engaged by an elongated fingerlike plastic pawl which is integral with and cantilevered from the plastic hubodometer frame.

DETAILED DESCRIPTION OF THE DRAWINGS

In order that all of the structural features for attaining the objects of this invention may be readily understood, reference is made to the accompanying drawings in which:

FIG. 7 is a section view, similar to that of FIG. 3, showing the basic hubodometer frame housing a second selection of gears and support shaft to provide a second range of gear ratios;

FIG. 8 is a fragmentary view of the rear casing shell showing the rear boss for receiving the hubodometer support shaft and carrying the optional drive spur gear;

FIG. 9 is a section view taken along line 9—9 of FIG. 8 showing the bore of the rear boss;

FIG. 11 is a fragmentary side elevation view of a preferred embodiment of a pawl-driven, ratchet wheel assembly which further increases the range of gear ratios available when employed with the basic hubodometer structure;

FIG. 12 is a side elevation view of pawl and ratchet wheel assembly of FIG. 11;

FIG. 13 is a side elevation view of the drive pawl of FIGS. 11 and 12;

DETAILED DESCRIPTION OF THE INVENTION

Figure 1:
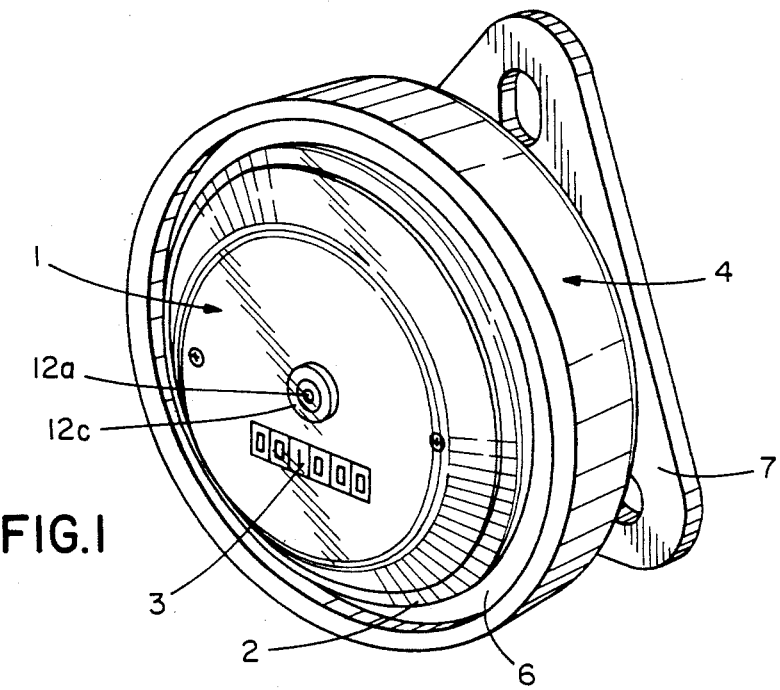
FIG. 1 is a perspective view of the hubodometer of this invention.
Figure 2:
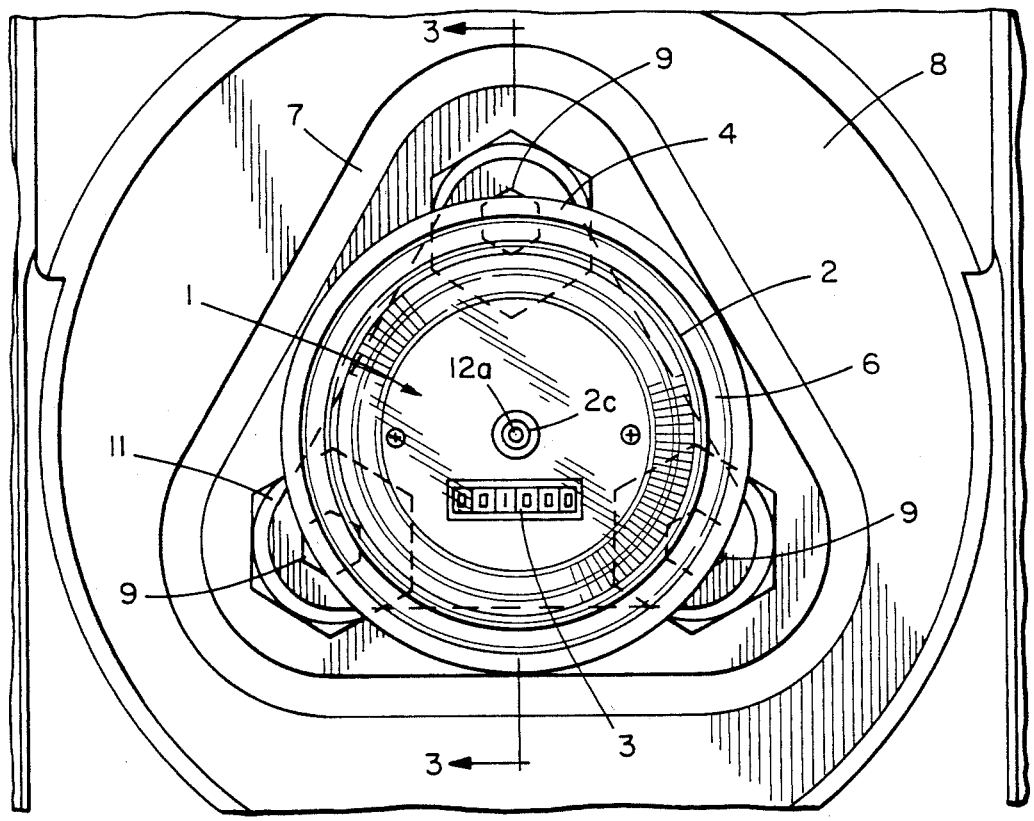
FIG. 2 is a front elevation view of the hubodometer fixed to a wheel hub.
Figure 3:
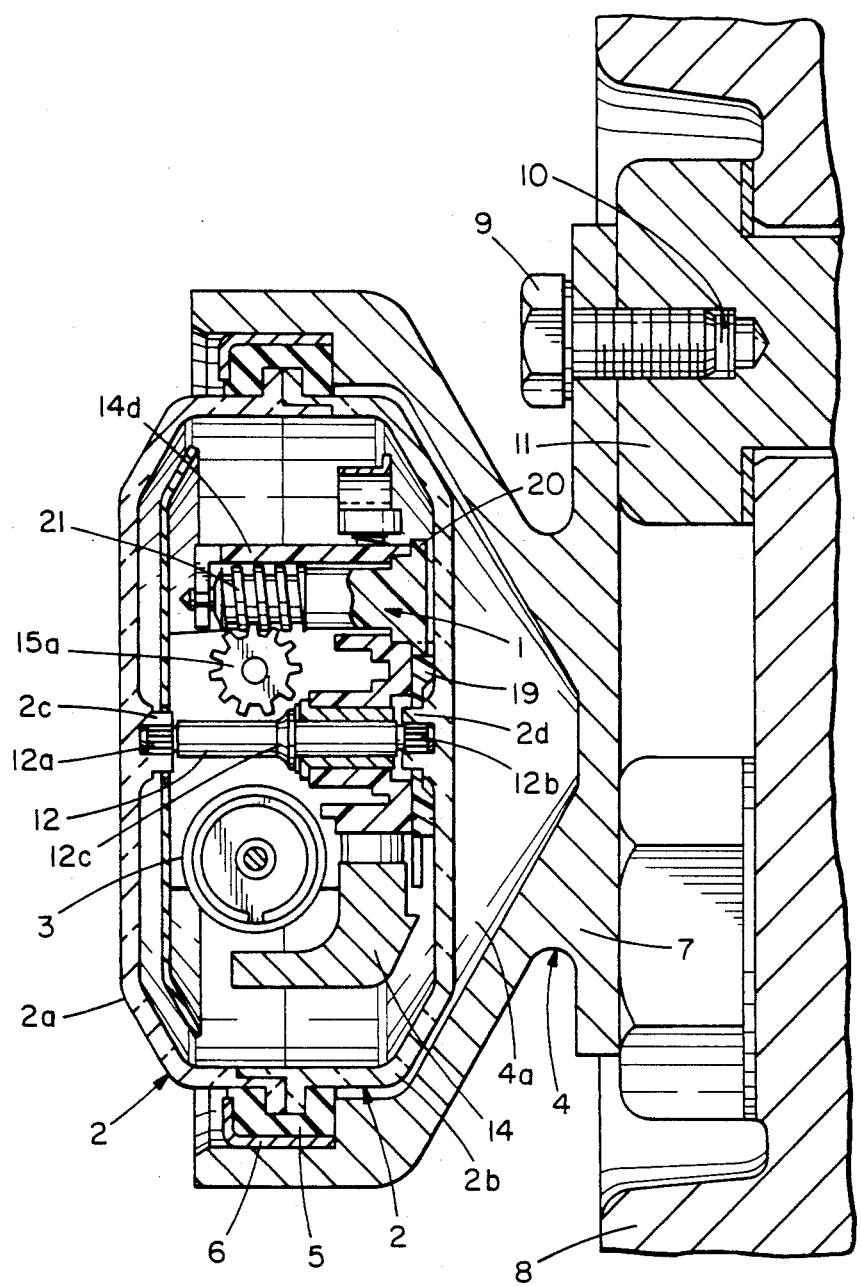
FIG. 3 is a section view taken along line 3—3 showing a basic hubodometer which houses a first selection of gears and support shaft to provide a first range of gear ratios.
Figure 4:
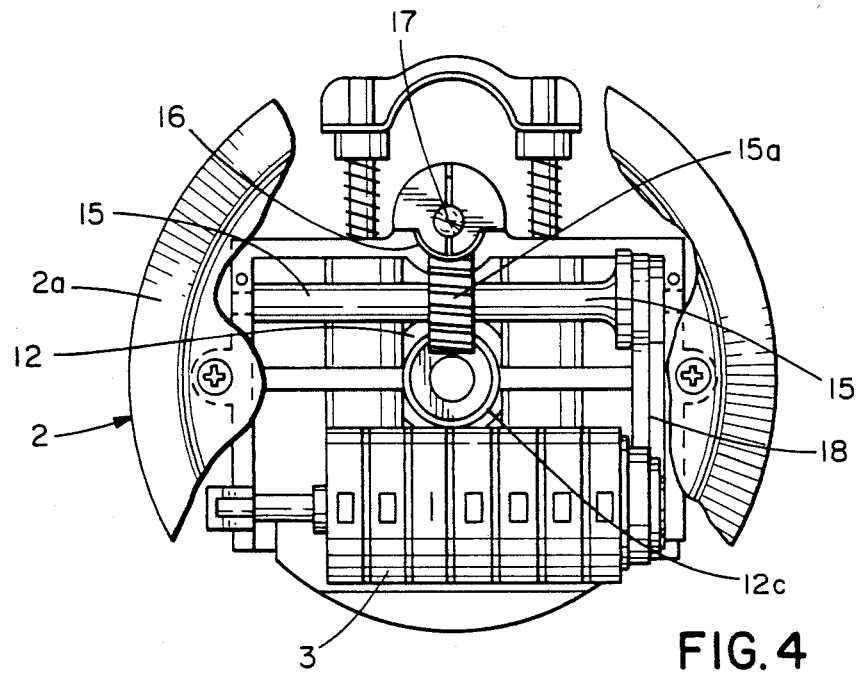
FIG. 4 is a front elevation view of the encased hubodometer structure of FIG. 3.
Figure 5:
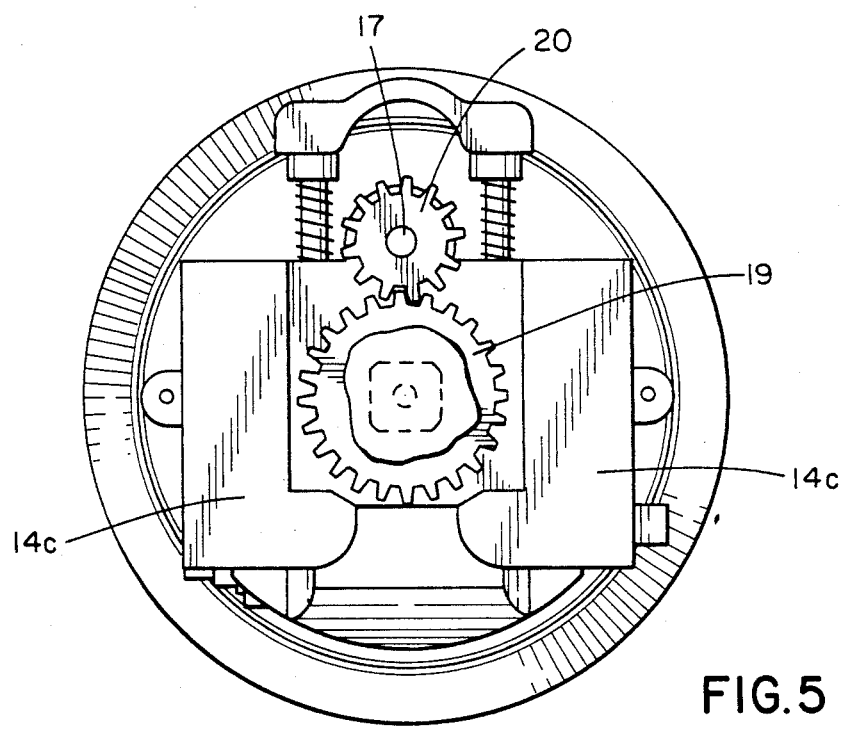
FIG. 5 is a rear elevation view of the structure of FIG. 4.
Figure 10:
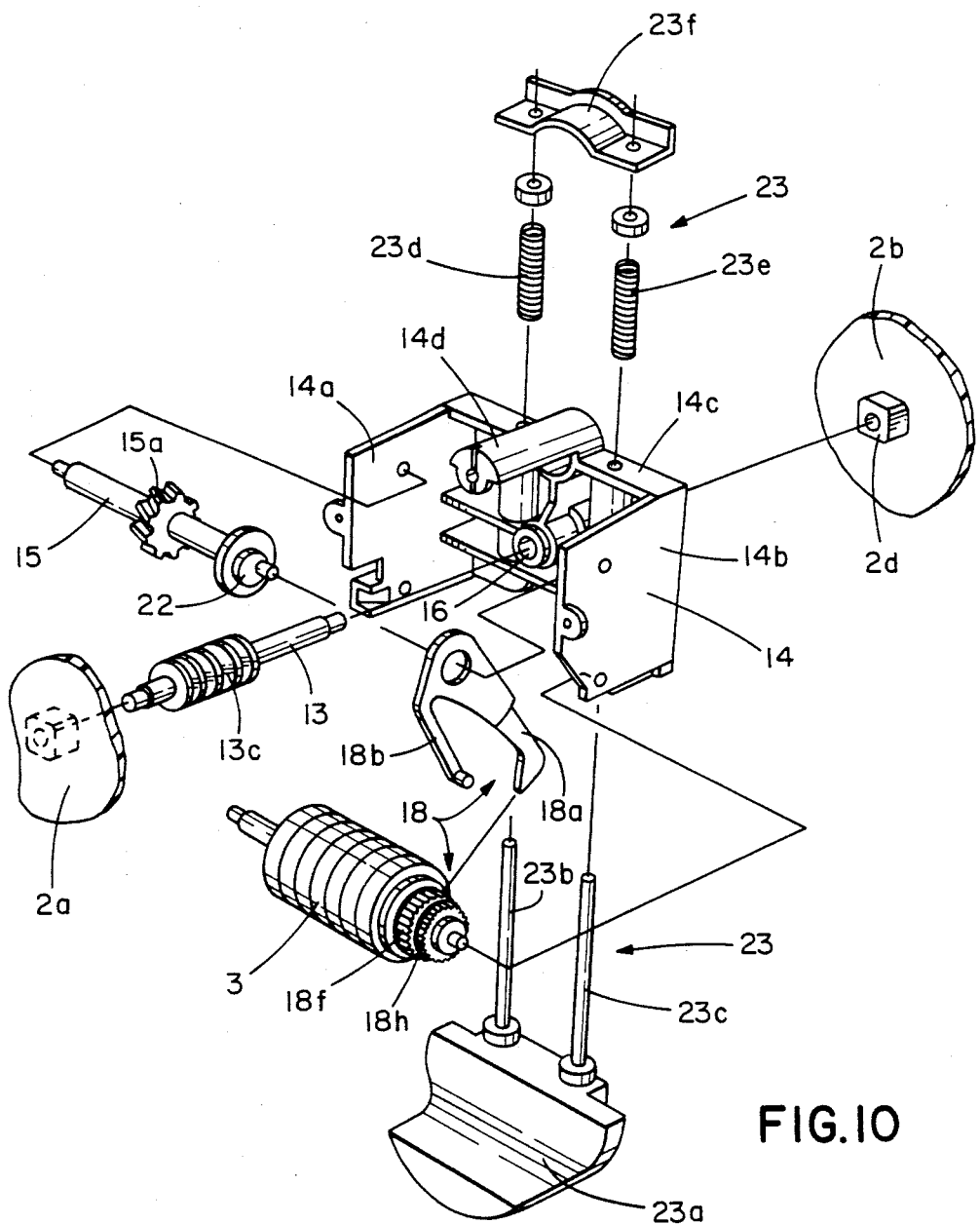
FIG. 10 is an exploded view of the structure of FIG. 7 which shows the second selection of gears and support shaft which provide the second range of gear ratios.

Referring to FIGS. 1, 2 and 3 of the drawings, odometer mechanism assembly 1 is housed within an enclosed cavity defined by plastic casing 2. FIGS. 3 through 6 show a first selection of gearing adapted to provide a metric readout at odometer register 3; and FIGS. 7 and 10 show a second selection of gearing adapted to provide readout in English units. In general, therefore, the gearing of the embodiment of FIGS. 3 through 6 provides a greater reduction than the gearing of FIGS. 7 and 10. Both gearing arrangements employ the same basic odometer mechanism assembly 1 and casing 2 to effect economy of manufacturing.

Casing 2 is partially housed within a socket 4a defined by metallic mounting bracket 4. A toroidal shock mount, which includes Neoprene gasket 5 for metallic retainer ring 6 (FIGS. 3 and 7), provides the sole support for casing 2 on mounting bracket 4. This shock mount is the subject matter of U.S. Pat. No. 4,430,561 issued Feb. 7, 1984. Mounting bracket 4 has a generally triangular flanged base 7 which is typically secured to a wheel-cover plate 8 by a plurality of bolts 9 (FIGS. 2 and 3). Each of bolts 9 engages a threaded bore 10 located within the head of an associated wheel-cover plate bolt 11.

The rotation of wheel-cover plate 8 produces a corresponding rotation in mounting plate 4 and casing 2.

Figure 6:
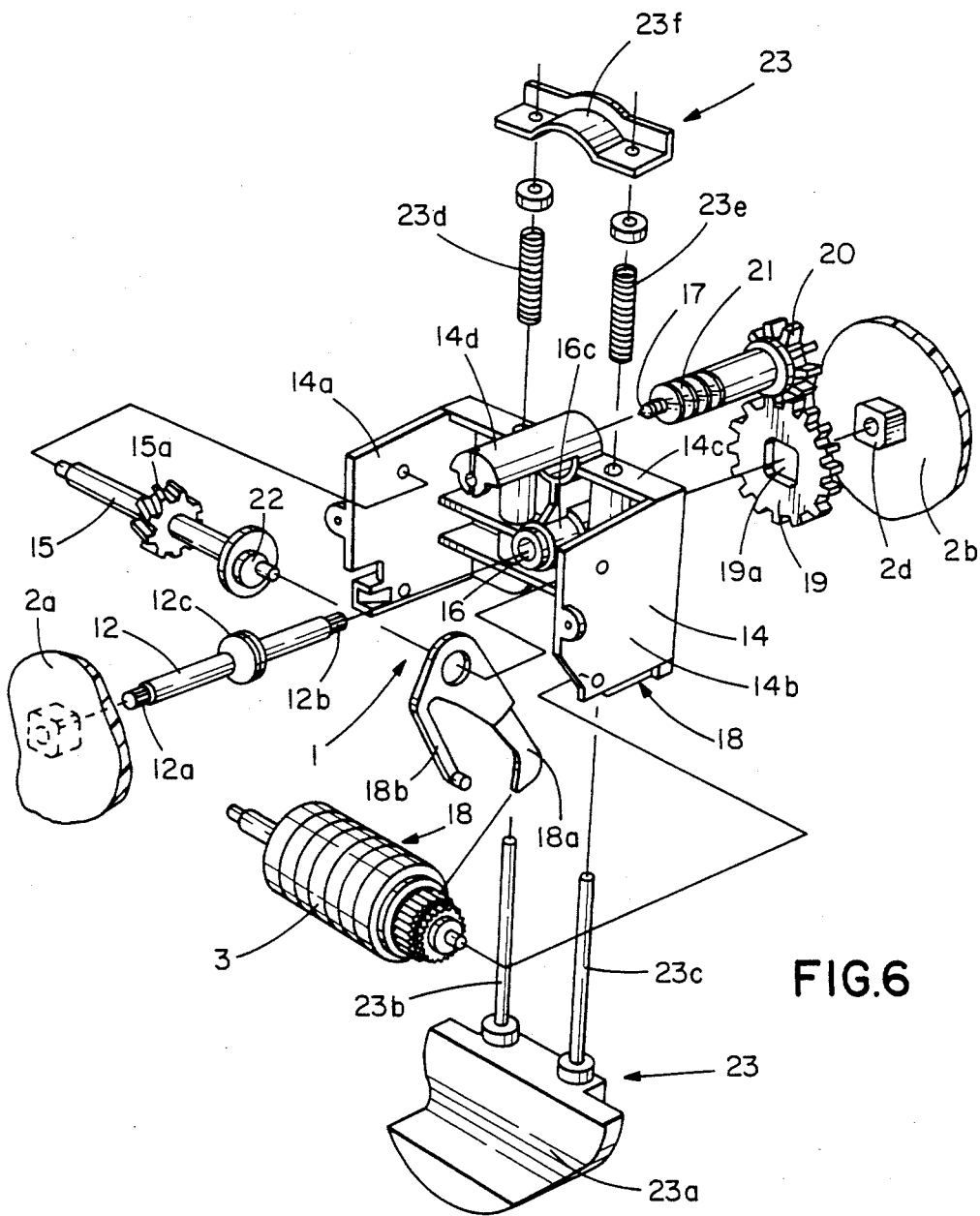
FIG. 6 is an exploded view of the structure of FIGS. 3 through 5 which shows the first selection of gears and support shaft which provide the first range of gear ratios.

Odometer mechanism assembly 1 is pivotally supported on either support shaft 12 (without gear; FIGS. 3, 6), or support shaft 13 (with gear; FIGS. 7, 10), depending on the range of gear ratios desired in driving the odometer mechanism assembly 1. Typically support shaft 12 is used for metric readings, and support shaft 13 for readings in English units. Both support shafts 12 and 13 extend across the internal cavity of casing 2 in alignment with the axis of rotation of the composite wheel cover 8, mounting bracket 4, and the casing 2 subcombination (FIGS. 3, 7).

The knurled extremities 12a, 12b of support shaft 12 are anchored to casing shells 2a, 2b at central bearing bosses 2c, 2d (FIGS. 3, 6). The knurled extremities 13a, 13b of support shaft 13 are anchored to casing shells 2a, 2b (FIGS. 7, 10) at central bearing bosses 2c, 2d (FIGS. 7, 10). Accordingly, both support shaft 12 without gear, and support shaft 13 with gear 13c rotate when casing 2 rotates.

Odometer mechanism 1 includes a U-shaped plastic frame 14 having a pair of spaced arms 14a, 14b joined by a base section 14c. Both support shafts 12 (FIG. 6) and 13 (FIG. 10) extend loosely through bore 16 defined by cylindrical housing 16a located in base section 14c. Support shaft 12 is formed with a shoulder 12c (FIG. 3) which locates frame 14 on support shaft 12, and gear 13c locates frame 14 on shaft 13.

Odometer helical drive gear shaft 15 extends between frame arms 14a, 14b and is rotatably journalled in those arms. The center portion of shaft 15 (FIGS. 4, 6, 10) is formed with an integral helical drive gear 15a.

In the metric gearing arrangement of FIGS. 3 through 6, helical drive gear 15a is engaged from above by driven worm gear 21 fixed to driven gear shaft 17. Driven gear shaft is located within a cantilevered housing 14d projecting from frame base 14c. In the English unit readout of FIGS. 7 and 10, helical drive gear 15a is engaged from below by gear 13c. In either case, shaft 15 is rotated to actuate eccentrically pivoted cam 22 (FIGS. 6, 10). The rotary motion of cam 22 drives the novel ratchet and pawl assembly 18 (FIGS. 11 through 15) to drive odometer register 3 as hereafter set forth to provide readout in either metric or English units.

The metric gear train for driving odometer register 3 includes drive spur gear 19, driven spur gear 20, shaft 17, worm 21 and helical gear 15a which rotates cam 22.

The English unit gear train for driving odometer register 3 includes gear 13c and helical drive gear 15a which rotates cam 22.

In the metric gear train, drive spur gear 19 is formed with a central square hole 19a which is seated upon central bearing boss 2c to rotate with casing 2. The rotation of drive spur gear 19 with casing 2 in turn rotates driven spur gear 20. The rotation of driven spur gear 20, drives worm 21 which engages helical gear 15a. The rotation of helical gear 15a actuates cam 22 to drive ratchet and pawl assembly 18 to step odometer register 3.

When the English unit gear train is used, spur drive gear 19, and integral gear and shaft subcombination 17, 20 and 21 are omitted as surplus elements, and shaft 13 with gear 13c is inserted within bore 16. Thus, ratchet and pawl mechanism 18 is stepped by the engaged gears 13c and 15a.

The range of gear ratios obtainable from both the metric unit and the English unit gear train is further broadened by the novel ratchet and pawl assembly 18 of this invention (FIGS. 6, 10–14). Assembly 18 comprises a plastic pawl 18a formed with an arcuate and elongated pawl restraining arm 18b which is integrally and resiliently attached to the pivoted end of the pawl. Pawl 18a is formed with a circular opening 18c which receives eccentrically pivoted drive cam 22. A pawl restraining pin 18d is integrally attached to the projecting end of restraining arm 18b. As is best shown in FIG. 11, when pawl 18a is seated upon cam 22, restraining pin 18d is lodged within a slot 23 formed in frame arm 14b. Slot 23 is so positioned that restraining arm 18b is sprung away from pawl 18a when compared to the normal positioning of these elements when unseated (FIG. 13).

Pawl 18a is formed with a pointed tooth 18e which is forcibly driven into engagement with the interdental notches located between the peripheral teeth of the drive ratchet wheel 18f. Accordingly rotation of cam 22 causes pawl 18a to step drive ratchet wheel in a clockwise direction (FIG. 11). The continuous biasing force generated by restraining arm 18b holds pawl 18a against drive ratchet wheel 18f during the intermittent stepping sequence.

In order to prevent drive ratchet wheel 18f from moving backwardly with pawl 18a after a forward stepping motion, an elongated stop pawl 18g formed as a resilient elongated finger integral with frame arm 14b engages the interdental notches located between the peripheral teeth of ratchet stop wheel 18h. Accordingly, drive ratchet wheel is locked in place and does not retreat when pawl 18a is pivoted from one notch to the next adjacent notch of the ratchet wheel.

Both ratchet wheels 18f and 18h are formed as an integral compound ratchet wheel. The dimensional relationship shown in FIGS. 14 and 15 for ratchet wheels 18f and 18h provide different gear ratios which broaden the range of gear ratios attainable from both the metric and English unit gear trains previously described.

Figures 14, 15:
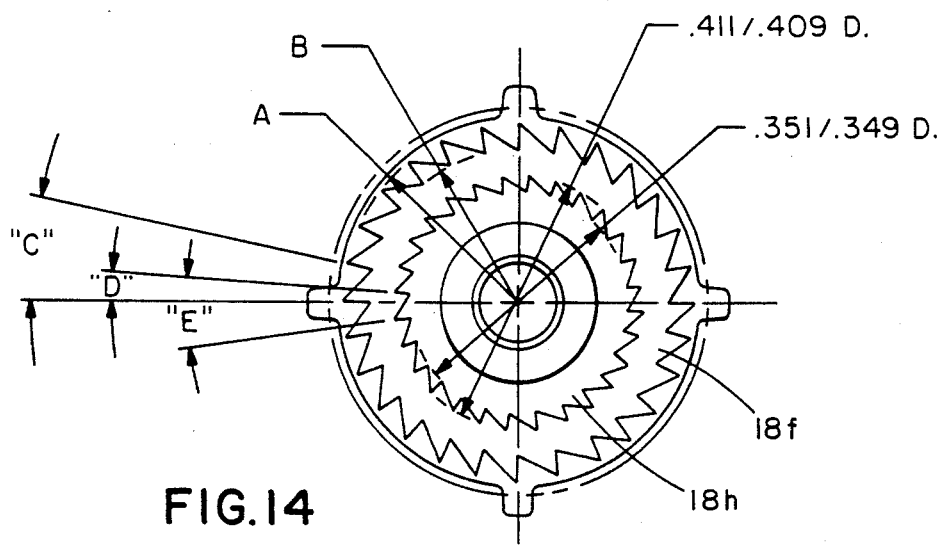
FIG. 14 is a diagram of assistance in explaining the physical dimensions which are to be used in designing the several compound ratchet wheels required to provide the enhanced range of gear ratios.
FIG. 15 is a table of typical values for the various dimensions shown in FIG. 14 for the compound ratchet wheel.

Since the length and positioning of elongated stop pawl 18g is fixed as it is integral with frame arm 14b, the physical dimensions of stop pawl 18g are fixed for all gear ratios attainable from the compound ratchet wheel. Specifically, in a preferred embodiment the number of gear teeth is fixed at 36 equally spaced teeth. Additionally, the diameters of ratchet stop wheel 18h are fixed when measured from the bottom of the interdental notches and also from the projecting points of the gear teeth (FIG. 14).

Different gear ratios are obtained, however, by varying the number of teeth located on the periphery of drive ratchet wheel 18f. As is shown in the table of FIG. 15 under the column captioned "TEETH-18f", practical ratios are obtained by having 22 to 28 and 31 and 39 equally spaced teeth. The "A" DIM. and the "B" DIM. columns list the varying radii when measured from the bottom of the interdental notches and also from the projecting points of the drive gear teeth.

The projected angles C and E measured from adjacent radial sides of both ratchet stop wheel 18h and ratchet drive wheel 18f are both identical and vary as shown in the "C" and "E" DIM. columns.

The "D" column measures the angular displacement of the projected angle defined from a radial side of the locking ratchet wheel teeth to the adjacent radial side of the drive ratchet wheel teeth. As shown there is a varying angular displacement with variations in the number of teeth.

Accordingly if a set of different compound ratchet wheels 18f-18g is fabricated as specified in the table of FIG. 15, the same basic hubodometer structure using either a metric unit or an English unit gear train can provide different total gear ratios by selecting the proper desired compound ratchet wheel 18f-18h.

Odometer mechanism assembly 1 carriers a conventional centrifugal weight assembly 23 which includes lead weight 23a. As is well known in the hubodometer art, the dynamic effect of weight 23a is to maintain frame 14 in a stable attitude when the attached wheel rotates. In particular, weight 23a is coupled to two elongated shafts 23b and 23c each housed within separate bores passing through base section 14c of frame 14. Springs 23d and 23e envelop the elongated shafts 23b and 23c, respectively. Shaft tie plate 23f couples shafts 23b and 23c so that both shafts move in unison.

Springs 23d and 23e are normally in an expanded, elongated condition which causes weight 23a to assume a retracted position relative frame 14. Weight 23a tends to maintain the odometer mechanism assembly 1, and therefore odometer register 3, at a stable attitude. In the event the hubodometer is subjected to impact or shock which has the tendency to cause the odometer assembly mechanism to rotate, then weight 23a compresses 23d and 23e, thereby enabling weight 23a to move away from the center of rotation of the hubodometer. This weight 23a movement counteracts, in a conventional way, any tendency for the hubodometer to rotate.

It should be understood, that the structural features described are merely illustrative of a preferred application of the principles of this invention. Structural modifications can be made without departing from the principles of the invention

What is claimed is:

1. In a hubodometer having a housing adapted for coupling to a rotating object so as to rotate with that object, a weighted frame located within the housing and pivoted relative the housing so as to be independent of the housing rotation, an odometer register supported on the frame and having a plurality of sequentially stepped register wheels actuated by a ratchet and pawl mechanism, an improved ratchet wheel assembly comprising a compound ratchet wheel having a pawl driven ratchet wheel section and a ratchet stop wheel section with each section having a different diameter and being integrally fixed one to the other to rotate on a common axis and also having an independent set of a different number of peripheral teeth, a drive pawl engaging the pawl driven ratchet wheel section to step the compound ratchet wheel in response to rotation of the hubodometer, and a locking pawl engaging the ratchet stop wheel section to lock the compound ratchet wheel against reverse rotation as the drive pawl is pivoted from one notch to the next adjacent notch to actuate the odometer register.

2. The combination of claim 1 in which the locking pawl is fixed to the hubodometer frame and is cantilevered therefrom to engage the ratchet stop wheel section.

3. The combination of claim 2 in which the locking pawl is an elongated finger resiliently fixed to the hubodometer frame with the projecting finger engaging the interdental notches located between the peripheral teeth of the ratchet stop wheel.

4. The combination of claim 1 in which an arcuate and elongated pawl restraining arm is integrally formed with the drive pawl to force the drive pawl into engagement with the pawl driven ratchet wheel section.

5. The combination of claim 4 in which the integral drive pawl and restaining arm are formed into a generally U-shaped configuration.

6. The combination of claim 5 in which the restraining arm and drive pawl subcombination is pivoted on the hubodometer frame generally at a locus where the arm and pawl are joined to each other and the terminal portion of the restraining arm is loosely anchored in a slot formed in the hubodometer frame.

7. In a hubodometer having a housing adapted for coupling to a rotating object so as to rotate with that object, a weighted frame located within the housing and pivoted relative the housing so as to be independent of the housing rotation, an odometer register supported on the frame and having a plurality of sequentially stepped register wheels actuated by a pawl driven ratchet wheel in which a drive pawl has an elongated tongue-like body which is pivoted generally at one end of the body and which has a pointed tooth at the opposite end of the body engaging the interdental notches located between the peripheral teeth of the ratchet wheel to drive the ratchet wheel, the improvement comprising an arcuate and elongated pawl restraining arm forcing the drive pawl into engagement with the ratchet wheel with the restraining arm being integrally and resiliently attached to the pivoted end of the drive pawl, a pawl restraining pin integrally attached to the end of the pawl restraining arm opposite the end attached to the drive pawl and with the pin lodged to move within a slot formed in the frame, an odometer ratchet stop wheel fixed to the pawl driven ratchet wheel, and an elongated stop pawl having an elongated finger resiliently attached to the frame with the projecting finger engaging the interdental notches located between the peripheral teeth of the ratchet stop wheel, and gear means coupled to the housing and the drive pawl to step pivot the drive pawl in response to the relative rotation of the housing with respect to the frame whereby as the pawl driven ratchet wheel is advanced by the drive pawl and the drive pawl is pivoted to engage the next adjacent interdental space the stop pawl engages an interdental notch of the ratchet stop wheel so that the odometer ratchet wheel is locked in place and does not reverse as the drive pawl is pivoted from one notch to the next adjacent notch of the ratchet wheel.

8. In a hubodometer having a housing adapted for coupling to a rotating object so as to rotate with that object, a weighted frame located within the housing and pivoted relative the housing so as to be independent of the housing rotation, a gear driven odometer register supported on the frame and having a plurality of register wheels sequentially stepped by a pawl driven ratchet wheel and in which the pawl driven ratchet wheel is driven by an odometer drive gear which is shaft mounted on the hubodometer frame transversely to the axis of rotation of the hubodometer, the improvement relating to increasing the range of selectable gear ratios for the hubodometer comprising gear means supported at least in part by the hubodometer frame with the gear means coupled to the housing and the pawl driven ratchet wheel to step pivot the ratchet wheel in response to the relative rotation of the housing with respect to the frame and with the hubodometer frame receiving alternatively either at least a part of a first gear train having a first gear ratio to engage the odometer drive gear at a first locus of gear engagement, or at least a part of a second gear train having a second gear ratio to engage the odometer drive gear at a second locus of gear engagement.

9. The combination of claim 8 in which the first locus and the second locus of gear engagements are diametrically opposite one another on the periphery of the drive gear.

10. The combination of claim 8 in which the frame has an elongated bore extending through the frame and centered on the axis of rotation of the hubodometer, the first gear train includes a support shaft having a gear located within the bore and fixed to rotate with the casing on its axis of rotation, so that its gear drives the first gear train in response to the rotation of the hubodometer casing with a first gear ratio, and the support shaft with gear is omitted and a support shaft without gear is substituted within the bore when the odometer mechanism is to be driven at the second gear ratio.

11. The combination of claim 10 in which the second gear train is driven by a gear fixed to rotate with the hubodometer casing.

12. In a hubodometer having a housing adapted for coupling to a rotating object so as to rotate with that object, a weighted frame located within the housing and pivoted relative the housing so as to be independent of the housing rotation, a gear driven odometer register supported on the frame and having a plurality of register wheels sequentially stepped by a pawl driven ratchet wheel, the improvement relating to increasing the range of selectable gear ratios for the hubodometer comprising an elongated bore extending through the frame and centered on the axis of rotation of the hubodometer, an odometer drive gear and shaft with the shaft mounted on the frame transversely to the hubodometer axis of rotation and displaced from the bore in the frame, and either a support shaft having a gear located within the bore and fixed to rotate with the casing on its axis of rotation and to engage the odometer drive gear to actuate the pawl driven ratchet wheel so that the odometer register reading is responsive to the rotation of the casing with a first gear ratio, or alternatively, all the following elements: a support shaft having no gears located within the bore and fixed to rotate with the housing, a drive gear mounted on the housing to rotate with the housing on its axis of rotation and a driven gear engaging the drive gear, a driven gear shaft rotatably supported on the frame on an axis removed from the bore but parallel to the axis of rotation of the hubodometer with the driven gear being fixed to one end of the driven gear shaft to rotate the shaft in response to rotation of the housing, a second driven gear being fixed to the other end of the driven gear shaft to rotate with the driven gear shaft, and the second driven gear engaging the odometer drive gear to actuate the pawl driven ratchet wheel so that the odometer register reading is responsive to the rotation of the housing with a second gear ratio.

13. The combination of claim 12 in which the odometer drive gear is a helical drive gear, both the drive gear mounted on the housing and the driven gear engaging the drive gear being spur gears, and the second driven gear being a worm gear.

* * * * *